United States Patent
Diem

(10) Patent No.: US 7,631,558 B2
(45) Date of Patent: Dec. 15, 2009

(54) MICROSYSTEM, MORE PARTICULARLY MICROGYROMETER, WITH CAPACITIVE ELECTRODE DETECTION ELEMENT

(75) Inventor: Bernard Diem, Echirolles (FR)

(73) Assignee: Commissariat a l'energie Atomique, Paris (FR)

( * ) Notice: Subject to any disclaimer, the term of this patent is extended or adjusted under 35 U.S.C. 154(b) by 375 days.

(21) Appl. No.: 11/889,182

(22) Filed: Aug. 9, 2007

(65) Prior Publication Data

US 2008/0053226 A1    Mar. 6, 2008

(30) Foreign Application Priority Data

Sep. 1, 2006    (FR) .................................. 06 07692

(51) Int. Cl.
*G01P 9/04*    (2006.01)
(52) U.S. Cl. .................................. 73/504.12
(58) Field of Classification Search ............... 73/504.12, 73/504.14, 504.16, 514.32
See application file for complete search history.

(56) References Cited

U.S. PATENT DOCUMENTS

| | | | |
|---|---|---|---|
| 5,728,936 A | 3/1998 | Lutz | |
| 6,044,707 A * | 4/2000 | Kato | 73/504.14 |
| 6,705,164 B2 * | 3/2004 | Willig et al. | 73/504.12 |
| 6,752,017 B2 | 6/2004 | Willig et al. | |
| 2001/0029784 A1 | 10/2001 | Kurachi et al. | |
| 2006/0156815 A1 | 7/2006 | Chen et al. | |

FOREIGN PATENT DOCUMENTS

| | | |
|---|---|---|
| WO | WO 01/22094 A2 | 3/2001 |
| WO | WO 2004/042324 A1 | 5/2004 |
| WO | WO 2007/077353 A2 | 7/2007 |

* cited by examiner

*Primary Examiner*—John E Chapman
(74) *Attorney, Agent, or Firm*—Oliff & Berridge, PLC

(57) ABSTRACT

The microgyrometer is provided in a flat substrate and comprises detection means for detecting the movement of two oscillating masses in a measuring direction perpendicular to an excitation direction. The detection means comprise an excitation frame associated with each oscillating mass and a mobile detection element surrounded by a corresponding excitation frame and comprising a plurality of mobile electrodes, and first and second sets of interconnected fixed electrodes fixedly secured to the substrate on which they are formed. Each mobile electrode is disposed between associated fixed electrodes of the first and second sets to form two variable differential capacitors. The fixed electrodes of each set are interconnected by means of interconnection bars made of electrically conducting material extending above the fixed electrodes in a plane substantially parallel to the substrate.

10 Claims, 3 Drawing Sheets

MICROSYSTEM, MORE PARTICULARLY MICROGYROMETER, WITH CAPACITIVE ELECTRODE DETECTION ELEMENT

BACKGROUND OF THE INVENTION

The invention relates to a microsystem provided in a flat substrate and comprising:
- at least two oscillating masses connected to the substrate by flexible suspension means,
- excitation means for exciting said oscillating masses in a predetermined excitation direction,
- and detection means for detecting movement of said oscillating masses in a measuring direction perpendicular to said excitation direction, said detection means comprising an excitation frame associated with each oscillating mass, and a mobile detection element surrounded by the corresponding excitation frame and comprising a plurality of mobile electrodes, and first and second sets of interconnected fixed electrodes fixedly secured to the substrate on which they are formed, each mobile electrode being arranged between associated fixed electrodes of the first and second sets to form two variable differential capacitors.

STATE OF THE ART

In the field of Microsystems, of the sensor or actuator type, it is known to use a microgyrometer for inertial measurement of the speed of rotation. A microgyrometer conventionally uses the Coriolis force, generated by a mass vibrating due to the effect of a rotation, to measure the speed. The Coriolis force is generated in a direction perpendicular to the excitation vibration and to the axis of rotation.

A microgyrometer is a component that is micro-machined, preferably in the plane of a substrate, and conventionally comprising at least two oscillating masses driven by any suitable excitation means in the same oscillation direction, but in opposite directions of movement (movement in phase opposition). Oscillating masses conventionally integrate in their structure detection elements designed to detect the Coriolis force.

There are two major detection families. The first family consists in detection in the plane of the substrate on which the microgyrometer is fabricated, with an axis of rotation perpendicular to the substrate. The second family consists in detection perpendicular to the plane of the substrate, with an axis of rotation in the plane of the substrate.

For technological reasons of simplicity and cost, a microgyrometer with detection in the plane of the substrate is most often used. U.S. Pat. No. 5,635,638 notably describes a microgyrometer with excitation and detection in the plane of the substrate, with detection by interdigital capacitive combs situated between the two oscillating masses. However, an asymmetry of the system is observed resulting in movements of the oscillating masses that are much less well controlled and detection that is very difficult to achieve.

The documents WO-A-2004042324 and U.S. Pat. No. 5,728,936 both describe a microgyrometer comprising detection means in the form of interdigital capacitive combs, a fixed comb and a mobile comb, enabling detection to be performed in a single direction parallel to the plane of the substrate. Detection does not however prove very efficient, as it does not participate in the inertial mass of the microgyrometer, and this type of detection elements substantially reduces the sensitivity of the microgyrometer. This results in a microgyrometer that is very difficult to implement.

The above described microgyrometers all present interdigital capacitive comb-based detection elements giving rise to detection that is not very efficient, in particular on account of the interference variations of the capacitance. The operation of such microgyrometers is therefore not optimal.

To remedy these shortcomings, U.S. Pat. No. 6,752,017 in particular describes a microgyrometer comprising a capacitive detection system with fixed electrodes and mobile electrodes forming variable differential capacitors. The detection system comprises an excitation frame associated with each oscillating mass, and a mobile detection element surrounded by the corresponding excitation frame and comprising a plurality of mobile electrodes. The detection system also comprises first and second sets of fixed electrodes, and each mobile electrode is arranged between fixed electrodes associated with the first and second sets to form two variable differential capacitors. The fixed electrodes are fixedly secured to the substrate on which they are formed, and are interconnected by a conducting layer conventionally made of polysilicon deposited on the substrate and electrically insulated from the substrate by an intermediate layer, for example of silicon nitride $Si_3N_4$, which must be selective in terms of etching with respect to a sacrificial layer of silicon oxide $SiO_2$ designed for formation of the electrodes.

However, such a detection system, produced by conventional microelectronics production methods, associated with polysilicon layers, does not give sufficient guarantees in terms of interconnection and electrical conductivity. As the conducting interconnection layers are notably produced at the beginning of the production process, they have to be compatible with the subsequent steps of the process. In particular they have to be able to withstand high temperatures, typically more than 700° C. A polycrystalline silicon conducting layer does enable this function to be ensured, but the conductivity of polycrystalline silicon is limited, lower than that of a metallic material.

Moreover, the electrical insulation performed by a dielectric such as silicon nitride $Si_3N_4$ leads to large interference capacitances with respect to the substrate. The dielectric constant of silicon nitride (defined by $$C = \varepsilon_{diet} \frac{S}{e}$$

is high and it is difficult to increase the thickness because of the mechanical stresses of the nitride layer. Finally, deposition of a nitride layer is long and therefore costly.

OBJECT OF THE INVENTION

The object of the invention is to remedy all the above-mentioned shortcomings, and has the object of providing a microsystem, more particularly a microgyrometer, comprising detection means enabling the effects of interference variations of the capacitance to be overcome, when excitation of its oscillating masses is performed, while at the same time optimizing the electrical conductivity of the electrodes of the microgyrometer.

This object is achieved by a microsystem according to the appended claims and more particularly by the fact that the fixed electrodes of each set are interconnected by means of interconnection bars made of electrically conducting material, extending above the fixed electrodes in a plane substantially parallel to the substrate.

BRIEF DESCRIPTION OF THE DRAWINGS

Other advantages and features of the invention will become more clearly apparent from the following description of particular embodiments of the invention given as non-restrictive examples only and represented in the accompanying drawings, in which.

DESCRIPTION OF PARTICULAR EMBODIMENTS

With reference to FIGS. 1 to 4, the microsystem 1 is more particularly a microgyrometer designed for determining a speed of rotation by measuring the vibration of mechanically coupled oscillating masses 2. The microgyrometer 1 more particularly comprises detection means notably enabling the effects of interference variation of the capacitance to be overcome, when movement of the oscillating masses 2 takes place in an excitation direction Ox, and designed to measure the Coriolis force generated by vibration of the oscillating masses. The microgyrometer 1 is for example produced by micro-machining in a flat substrate (not represented in FIGS. 1 to 4 for reasons of clarity) defining the representation plane of FIGS. 1 to 4.

Figure 1:
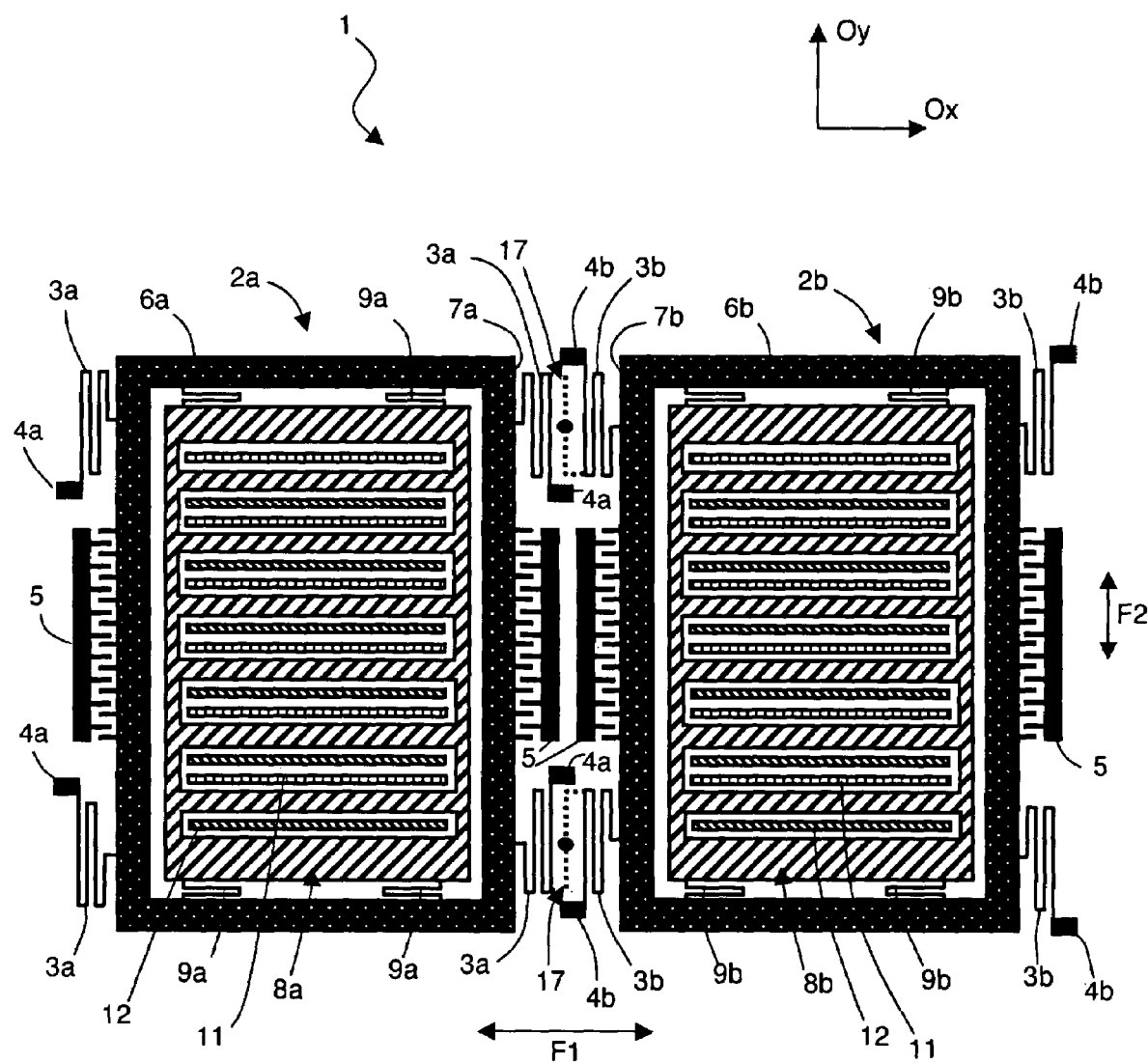
FIG. 1 schematically represents a top view in cross-section of a particular embodiment of a microsystem according to the invention, more particularly a microgyrometer, with two oscillating masses each comprising associated detection elements.

In the particular embodiment represented in FIG. 1, the microgyrometer 1 comprises two oscillating masses 2a and 2b having a substantially rectangular general shape and preferably identical and symmetrical on themselves and with respect to one another. Each oscillating mass 2a, 2b is flexibly suspended on the substrate by means of suspension springs 3a, 3b.

In the particular embodiment of FIG. 1, the suspension springs 3a, 3b are springs in the form of serpentine coils presenting one or more successive U-shaped branches in one and the same plane parallel to the substrate. The suspension springs 3a, 3b are respectively anchored at a first end on the corresponding oscillating mass 2a or 2b and at a second end on the substrate, by means of corresponding anchoring points 4a, 4b.

Each oscillating mass 2a, 2b is excited and driven in vibration in an excitation direction Ox, in the direction of the arrow F1 (FIG. 1), for example by means of interdigital capacitive combs 5 arranged on each side of each oscillating mass 2a, 2b.

As represented in FIG. 1, each oscillating mass 2a, 2b preferably comprises an excitation frame 6a, 6b, preferably of the same shape as the corresponding oscillating mass 2a, 2b, on which the first ends of the corresponding suspension springs 3a, 3b and the excitation interdigital capacitive combs 5 are fixed. The frames 6a, 6b thus present two opposite sides, respectively 7a, 7b, perpendicular to the excitation direction Ox. The opposite sides 7a, 7b are in particular designed to be mechanically coupled, and each respectively and preferably present two suspension springs 3a, 3b.

The opposite sides 7a, 7b of the oscillating masses 2a, 2b of the microgyrometer 1 are advantageously connected by special coupling means 17, schematically illustrated in FIG. 1 and described in greater detail in international patent application WO-A-2007/077353.

Figure 2:
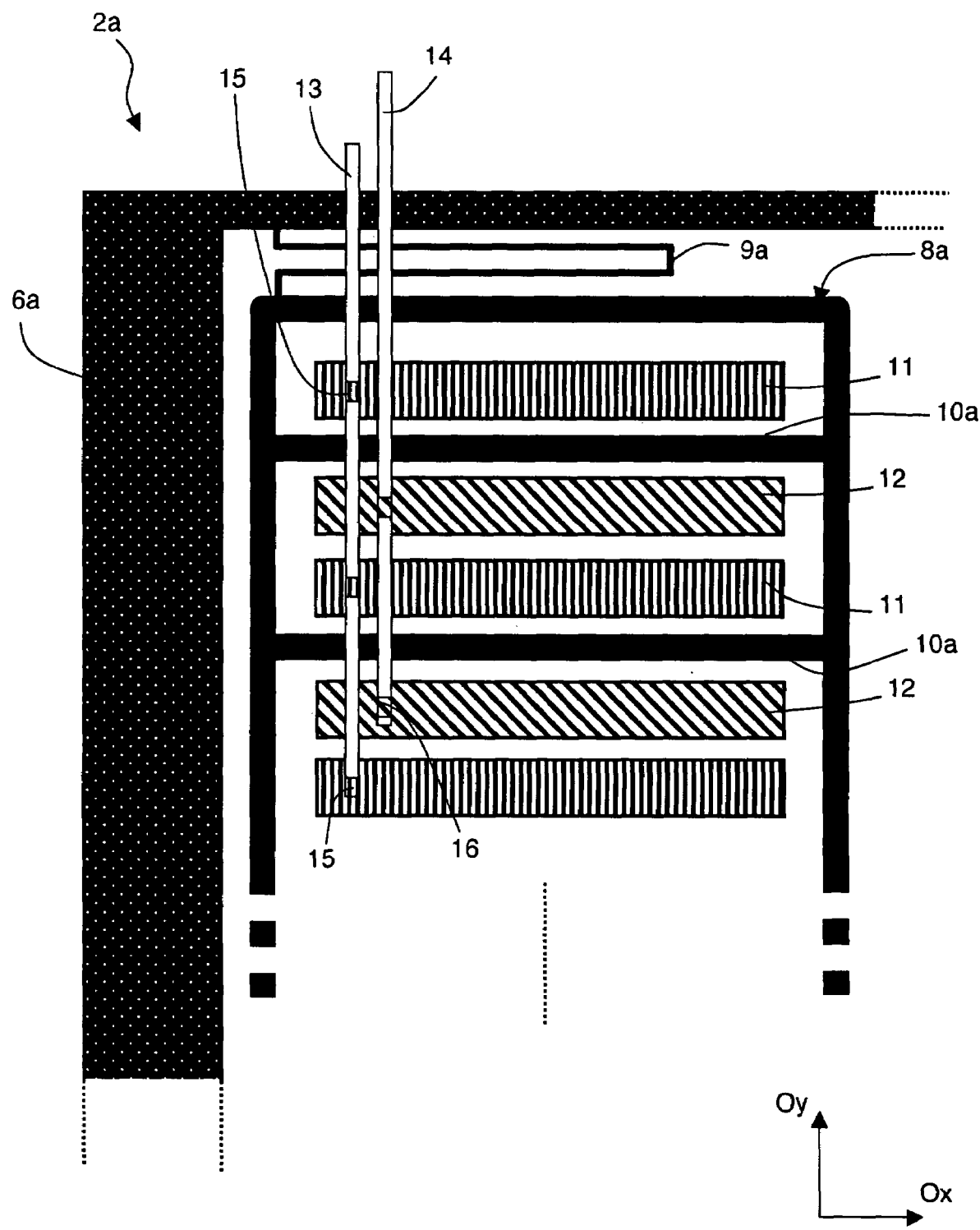
FIG. 2 schematically represents a greatly enlarged partial top view in cross-section of an oscillating mass of the microsystem according to FIG. 1.

The oscillating masses 2a, 2b each also comprise detection means participating in the inertial mass of the microgyrometer 1 and preferably identical for the two oscillating masses 2a, 2b. In FIG. 2, only a part of the oscillating mass 2a is represented. In the description below of the detection means, the references relative to the oscillating mass 2a also apply to the oscillating mass 2b.

In FIG. 2, the oscillating mass 2a comprises a mobile detection element 8a surrounded by the corresponding excitation frame 6a and connected to the excitation frame 6a, preferably by means of four flexible return springs 9a (FIG. 1), which allow a degree of freedom along the Oy axis. The mobile detection element 8a vibrates in the Oy direction, in the direction of the arrow F2 (FIG. 1), defining the axis of detection and measurement of the Coriolis force generated by vibration of the oscillating masses 2a, 2b.

For example, the flexible return springs 9a are springs in the form of serpentine coils presenting one or more successive U-shaped branches in one and the same plane parallel to the substrate. The return springs 9a are anchored at a first end on the excitation frame 6a and at a second end on the mobile detection element 8a.

The mobile detection element 8a comprises a plurality of transverse branches constituting a plurality of mobile electrodes 10a, and the microgyrometer 1 comprises two sets of fixed electrodes 11, 12, i.e. a first set of fixed electrodes 11 represented by vertical hatchings in FIGS. 1 and 2, and a second set of fixed electrodes 12 represented by slanted hatchings in FIGS. 1 and 2. The fixed electrodes 11, 12 are fixedly secured to the substrate on which they are formed, are insulated from the substrate by means for example of an intermediate layer of silicon nitride $Si_3N_4$ (not represented), and are arranged alternately one after the other on the substrate (FIGS. 1 to 4). The fixed electrodes 11, 12 of any one set are interconnected with one another (FIG. 2).

Each mobile electrode 10a of the mobile detection element 8a is disposed between a fixed electrode 11 of the first set of electrodes and a fixed electrode 12 associated with the second set of electrodes to form two variable differential capacitors. The air-gap between the fixed electrodes 11, 12 and the corresponding mobile detection element 8a is therefore variable when movement of the mobile detection element 8a takes place along the detection and measurement axis Oy (FIG. 2).

In the particular embodiment of FIGS. 1 and 2, the fixed electrodes 11 and 12 all have the same length, are parallel to the excitation direction Ox, and are arranged alternately one after the other in the detection and measuring direction Oy. The mobile detection element 8a is formed by a frame of rectangular shape, the transverse branches constituting the mobile electrodes 10a being identical and of the same length.

Figure 3:
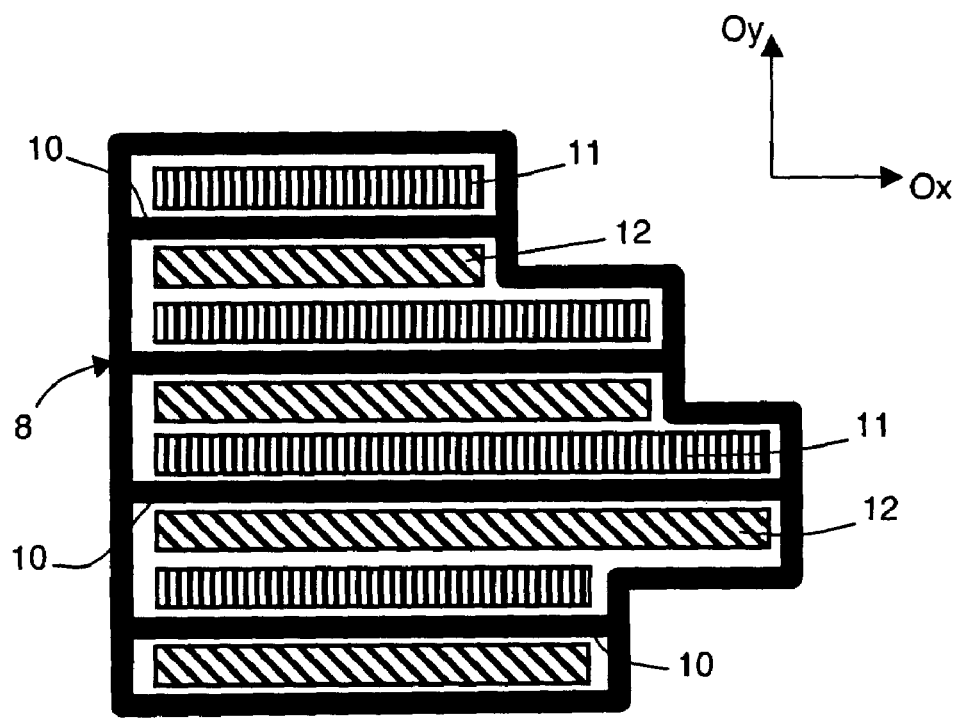
FIGS. 3 and 4 very schematically represent the detection elements associated with an oscillating mass of alternative embodiments of a microsystem according to the invention.
Figure 4:
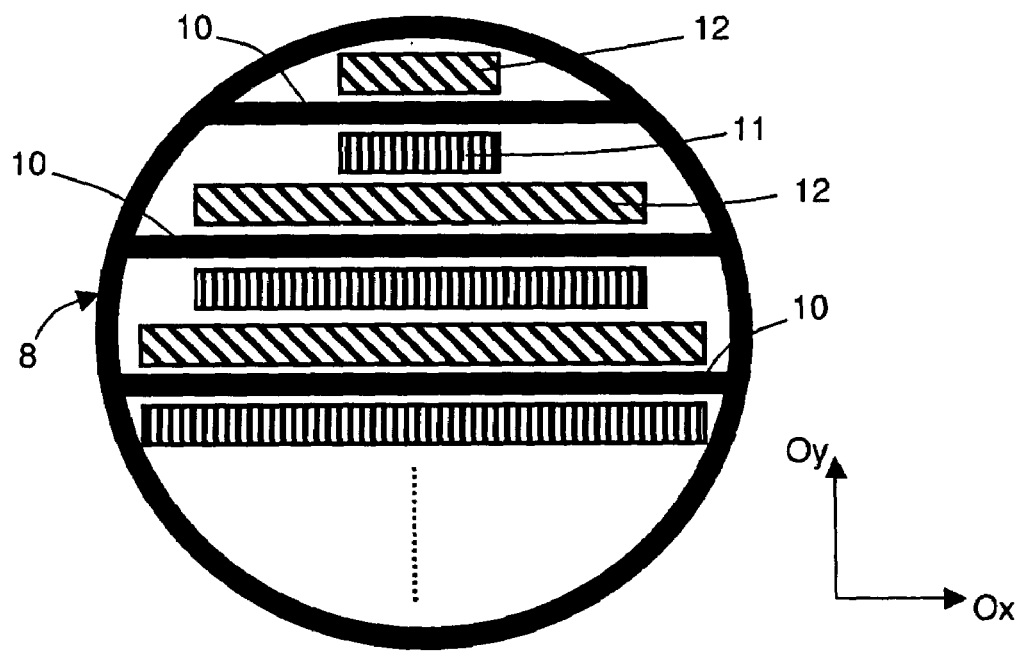

In FIGS. 3 and 4, the alternative embodiments of the microgyrometer 1 differ from the microgyrometer 1 represented in FIGS. 1 and 2 by the shape of their oscillating masses 2, of their excitation frames 6, of their mobile detection elements 8 and of their fixed electrodes 11, 12. In FIGS. 3 and 4, only one mobile detection element 8 associated with the two sets of fixed electrodes fixes 11, 12 is represented for the sake of clarity.

In FIG. 3, the mobile detection element 8 can be a frame of general asymmetric shape. The mobile electrodes 10 of the mobile detection element 8 then form transverse branches of different lengths each cooperating with a fixed electrode 11 of the first set of electrodes associated with a fixed electrode 12 of the same length of the second set of electrodes. The fixed electrodes 11 or 12 of one and the same set can have different lengths, depending on their position along the detection and measurement axis Oy.

In FIG. 4, the mobile detection element 8 is a frame of general circular shape surrounding all the associated fixed electrodes 11, 12. The mobile detection element 8 comprises transverse branches constituting the mobile electrodes 10 cooperating with the fixed electrodes 11, 12 to form variable differential capacitors. The fixed electrodes 11, 12 and mobile electrodes 10 then have different lengths, the fixed electrodes 11, 12 situated substantially in the centre of the mobile detection element 8 being in particular longer than the fixed electrodes 11, 12 situated substantially at the edge of the detection element 8, in the measuring direction Oy.

In a general manner, whatever the shape of the frame constituting a mobile detection element 8, the fixed electrodes 11 and 12 associated with a transverse branch of the mobile detection element 8 have a length that is smaller than or equal to the corresponding mobile electrode 10 (FIGS. 1 to 4), which is preferably salient on each side of the associated fixed electrodes 11, 12 to form variable differential capacitors. The fixed electrodes 11 and 12 are then called fully overlapping, i.e. the two associated fixed electrodes 11, 12 are of the same length and their surface facing the corresponding mobile electrode 10 is always identical when movement of the mobile detection electrode 8 takes place.

Thus, when rotation of the substrate takes place along the Oz axis, perpendicular to the plane Ox/Oy defined by the substrate, each mobile detection element 8a, 8b will vibrate and move in the Oy direction at the same frequency as excitation of the corresponding oscillating mass 2a, 2b in the excitation direction Ox. This movement is then measured by the fixed electrodes 11 and 12 cooperating with the mobile electrodes 10 of the associated mobile detection elements 8a, 8b, which then enable the speed of rotation to be determined.

The fixed electrodes 11, 12 and mobile detection elements 8a, 8b of the microgyrometer 1 thus enable the effects of interference variation of the capacitance to be overcome, when excitation of the oscillating masses 2a, 2b takes place in the excitation direction Ox. This results in optimal efficiency in terms of detection and measurement of the speed of rotation, and optimized operation of the associated microgyrometer.

In addition, as represented more particularly in FIG. 2, all of the fixed electrodes 11 of the first set and all of the fixed electrodes 12 of the second set are respectively interconnected by means of interconnection bars 13, 14 made of electrically conducting material (not represented in FIGS. 1, 3 and 4 for reasons of clarity). The interconnection bars 13, 14 are preferably insulated from the substrate in particular to enable measurements to be made by means of measurement contacts accessible from outside the microgyrometer 1.

The interconnection bars 13, 14, more particularly called "air bridges", extend above the sets of fixed electrodes 11, 12 and are arranged in a plane substantially parallel to the substrate. The interconnection bars 13, 14 are fixed to the fixed electrodes 11, 12 by means respectively of pads 15, 16 made of electrically conducting material. For example, the interconnection bars 13, 14 and corresponding pads 15, 16 form a single conducting part.

In an alternative embodiment, the interconnection bars 13, 14 are produced separately and are designed to adhere to the pads 15, 16, which are made from a material enabling the ohmic contact on the fixed electrodes 11, 12, which are made of silicon, to be optimized. For example, the material of the pads 15, 16 is selected to obtain a good ohmic contact on the corresponding fixed electrodes 11, 12, which are for example made of titanium, whereas the material of the interconnection bars 13, 14 must have a good electrical conductivity and a good mechanical strength.

Whatever the method of production, the interconnection bars 13, 14 are made from a material that is resistant to high temperatures and presents good mechanical characteristics. For example the interconnection bars 13, 14 can be made of doped polysilicon, doped silicon and germanium alloy SiGe, monocrystalline silicon or preferably metal. For example the interconnection bars 13, 14 can be made of aluminum, nickel, gold, copper, etc.

An example of a method of production of such interconnection bars 13, 14 will be described in greater detail with regard to FIG. 2. A first step consists in forming the different elements constituting the microgyrometer structure (oscillating masses, excitation frames, fixed electrodes and mobile electrodes). In a second step, a sacrificial layer, for example made of TetraEthylOrthoSilicate (TEOS), is deposited on the microgyrometer and then annealed at about 1000° C. to close the trenches between the fixed electrodes 11, 12. The sacrificial layer is then etched to delineate the location of the pads 15, 16 designed to support the interconnection bars 13, 14. Then a metallic deposition is made and etched to form the interconnection bars 13, 14, for example by means of masks. Finally the initially deposited sacrificial layer is etched to release the microgyrometer, with the interconnection bars 13, 14 extending above the fixed electrodes 11, 12.

Thus, whatever the method of production of the microgyrometer and whatever the shape of the mobile detection elements 8, such interconnection bars 13, 14 notably enable an optimal electrical conductivity to be obtained and the mechanical stresses to be reduced, particularly on account of their flexibility.

Producing the interconnection bars last on the top of the microgyrometer in particular offers a greater flexibility and a greater flexibility in the choice of material used for these interconnection bars (best possible conductor), while at the same time being compatible with conventional microelectronics methods (reducing the compatibility constraints). Moreover, as the interconnection bars are "in the air", their interference capacitances with respect to the substrate are greatly reduced.

The invention is not limited to the different embodiments described above. The interdigital capacitive combs 5 performing excitation of the oscillating masses 2a, 2b can be replaced by any other excitation means causing vibration of the oscillating masses 2a, 2b in the excitation direction Ox, for example electrostatic means, electromagnetic means or piezoelectric means.

The suspension springs 3a, 3b can be replaced by any other flexible suspension means, provided the latter enable mechanical coupling of the oscillating masses 2a, 2b.

The return springs 9a, 9b can be replaced by any other flexible return means, provided the latter enable movement of the associated mobile detection element 8a, 8b within the corresponding excitation frame 6a, 6b, i.e. provided they are able to transmit the excitation movement without deformation in the Ox direction, while enabling movement in the Oy direction.

The frames constituting the mobile detection elements 8 can be of any other shape and the fixed electrodes 11, 12 can be of different lengths, provided they enable variable differential capacitors to be formed with the associated mobile electrodes 10 of the mobile detection elements 8. The interconnection bars 13, 14 can be made of any other metal that is conducting and resistant to high temperatures.

The particular detection means described in FIGS. 1 to 4 can be integrated in any type of microsystem of the actuator or sensor type.

I claim:

1. A microsystem provided in a flat substrate and comprising:
    at least two oscillating masses connected to the substrate by flexible suspension means,
    excitation means for exciting said oscillating masses in a predetermined excitation direction,
    and detection means for detecting movement of said oscillating masses in a measuring direction perpendicular to said excitation direction,
said detection means comprising an excitation frame associated with each oscillating mass, and a mobile detection element surrounded by the corresponding excitation frame and comprising a plurality of mobile electrodes, and first and second sets of interconnected fixed electrodes fixedly secured to the substrate on which they are formed, each mobile electrode being arranged between associated fixed electrodes of the first and second sets to form two variable differential capacitors,
wherein the fixed electrodes of each set are interconnected by means of interconnection bars made of electrically conducting material, extending above the fixed electrodes in a plane substantially parallel to the substrate.

2. The microsystem according to claim 1, wherein the interconnection bars are fixed by pads to the fixed electrodes.

3. The microsystem according to claim 1, wherein the interconnection bars are made of a material resistant to high temperatures.

4. The microsystem according to claim 1, wherein the interconnection bars are made of polysilicon or of silicon and germanium alloy.

5. The microsystem according to claim 1, wherein the interconnection bars are made of metal.

6. The microsystem according to claim 5, wherein in the metal is selected from aluminum, nickel, gold, and copper.

7. The microsystem according to claim 1, wherein the fixed electrodes are parallel to the excitation direction and the mobile electrodes are transverse branches of a frame constituting each mobile detection element.

8. The microsystem according to claim 1, wherein each mobile detection element is a frame of rectangular shape.

9. The microsystem according to claim 1, wherein each mobile detection element is a frame of circular shape.

10. The microsystem according to claim 1, wherein each mobile detection element is a frame of asymmetric shape.

* * * * *